April 8, 1958  B. W. BADENOCH ET AL  2,829,665
UNLOADER VALVE FOR POWER TRANSMISSION
Filed July 21, 1954
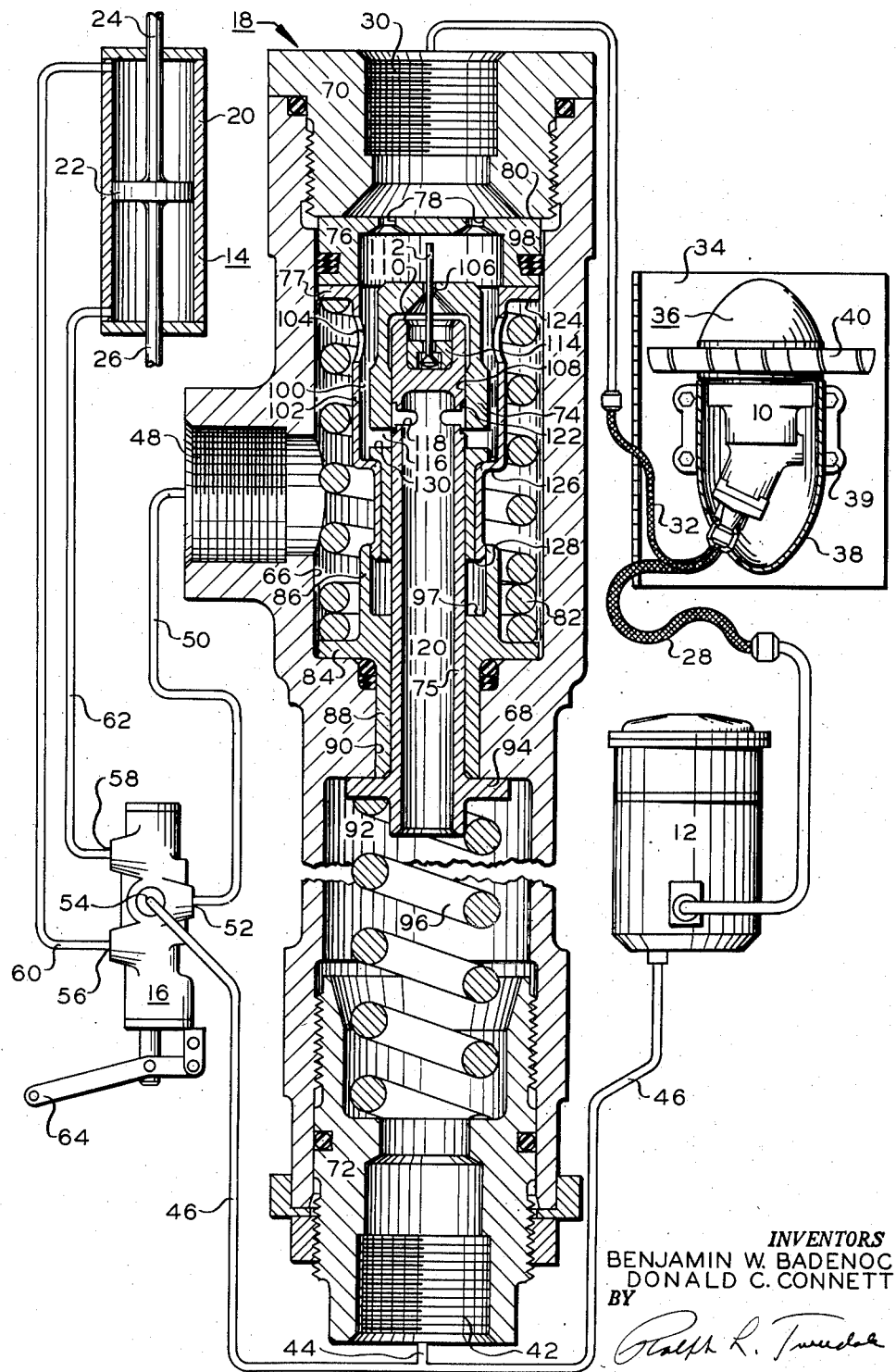
INVENTORS
BENJAMIN W. BADENOCH
DONALD C. CONNETT
BY
ATTORNEY

United States Patent Office 2,829,665
Patented Apr. 8, 1958

2,829,665

UNLOADER VALVE FOR POWER TRANSMISSION

Benjamin W. Badenoch, Pleasant Ridge, Mich., and Donald C. Connett, Redondo Beach, Calif., assignors to Vickers Incorporated, Detroit, Mich., a corporation of Michigan Application July 21, 1954, Serial No. 444,724

13 Claims. (Cl. 137—108)

This invention relates to power transmissions, and is particularly applicable to those of the type comprising two or more fluid pressure energy translating devices, one of which may function as a pump and another as a fluid motor.

The invention is generally concerned with pressure regulating valves utilized in such systems for controlling the maximum operating pressure of the system. The invention is more particularly concerned with a pressure regulating valve which is sensitive to flow in a manner to automatically vary the operating pressure of the system and to perform the function of a pressure relief valve at the operating pressure setting. The invention may thus be utilized in systems wherein it is advantageous to vary the maximum operating pressure of the system in accordance with changes in operating conditions.

Although a valve of this type has very many useful applications it will be described for purposes of convenience for use in a hydraulic transmission wherein the torque output of the prime mover for driving a fixed displacement pump varies with the R. P. M. of the prime mover and is insufficient at lower speeds to drive the pump against the highest desirable operating pressure of the system. The present invention provides a pressure regulating valve which will permit a desirable maximum operating pressure for the system when flow from the pressure fluid source is the highest and which will automatically lower the operating pressure of the system as flow from the pressure fluid source decreases. In the system to be described the torque output of the prime mover for driving the fluid pump decreases with decreases in speed. The present invention therefore permits greater utilization of the torque output capacity of the prime mover. In partciular applications it may prevent stalling of the prime mover and thus prevent complete collapse of the system.

It is therefore an object of this invention to provide an improved pressure regulating valve.

It is another object of this invention to provide a flow sensitive pressure regulating valve.

It is still another object of this invention to provide a valve for controlling the pressure setting of a hydraulic power transmission system in a manner to automatically vary the pressure setting with variations in flow from a fluid pressure energizing source.

It is a further object of this invention to provide a flow sensitive pressure regulating valve which is economical to manufacture and which is sensitive and efficient over a long and useful life.

Further objects and advantages of the present invention will be apparent from the following description, reference being had to the accompanying drawing wherein a preferred form of the present invention is clearly shown.

In the drawing:

The single figure is a diagrammatic view of a hydraulic power transmission system embodying a preferred form of the present invention.

Referring now to the single figure there is shown an emergency aircraft hydraulic power transmission system comprising a fixed displacement fluid pump 10 which is supplied with fluid from a reservoir 12 and which drives a double acting fluid motor 14, the directional operation of which is controlled by a manually operated valve 16. The operating pressure of the system is controlled by a pressure regulating valve 18. The motor 14 comprises a cylinder 20 within which is reciprocally mounted a fluid operated piston 22 having piston rods 24 and 26 associated therewith extending from opposite ends of the cylinder for driving a load device, not shown, such as a control surface of an aircraft.

The inlet side of the pump 10 is connected to the reservoir 12 by a conduit 28 while the delivery side thereof is connected to an inlet port 30 of the pressure regulating valve 18 by a conduit 32. Portions of the conduits 28 and 32 are of the flexible type by reason of the pump 10 being mounted on a door 34 on which is also mounted an air turbine 36 for driving the pump and which is adapted to be lowered from the plane when the emergency system is to be operated. The air turbine has been illustrated for the purposes of convenience as comprising a tubular housing 38 mounted by brackets 39 on the door 34 and within which the pump 10 is mounted. The blades 40 of the turbine are adapted to be propelled by the airstream and are associated in a suitable manner with the shaft of the pump for driving the same.

The pressure regulating valve 18 is also provided with a relief port 42 at one end thereof which is connected by a conduit 44 to a return conduit 46 leading to the reservoir 12. A demand or motor port 48 of the valve 18 is connected by a conduit 50 to a pressure delivery port 52 of the directional control valve 16. The directional control valve 16 is also constructed with a return port 54 connected to the reservoir 12 by the conduit 46 and also with motor ports 56 and 58 respectively connected by conduits 60 and 62 to the opposite ends of motor 14. A control handle 64 is provided for selectively connecting the pressure port 52 of the directional control valve to either of the motor ports 56 or 58 while the remaining motor port is connected to the return port 54 and in the neutral position shown for blocking communication between the ports of the valve.

The pressure regulating mechanism of the valve 18 is mounted within a longitudinal bore 66 extending completely through a housing 68 which is provided with closure members 70 and 72 for the opposite ends thereof respectively containing the inlet and relief ports 30 and 42.

The pressure regulating mechanism comprises a piston control valve 74 and a slide valve 75 telescopically mounted therein. The control valve has a flange 76 at the inlet port end thereof provided with a plurality of inlet ports 78 adapted to restrict pump flow of a predetermined volume. The port construction is adapted to cause a pressure increase at the inlet port 30 which acts against a pressure operating surface 80 of the flange 76 which is exposed to inlet pressure. The control valve 74 is biased to the opposition shown by a spring 82 in the bore 66 surrounding the control valve 74, one end of which abuts the inner end of a sleeve flange 77 and the opposite end of which abuts a flange 84 of a guide and retainer member 86. The opposed operating surface of the valve 74 is exposed to inlet pressure beyond the porting 78 in a manner to be later described to improve the operation of the valve. A guide portion 88 of the retainer member 86 is mounted in a partition 90 of the bore 66, the latter of which forms an exhaust chamber 92 in the other portion of bore 66 which leads to the relief port 42. The slide valve 75 extends through the guide portion 88 in the partition 90 and has a flange 94 biased against the exhaust chamber side of the partition 90 to the position shown by a spring 96 of predetermined resistance. The control valve 74 when operated shifts into the retainer member and a loose fit is provided therebetween for venting the extreme end of the valve. The movement of the control valve 74 is limited by the inner wall of the retainer member 86 which forms an operation limiting abutment indicated by the numeral 97.

The inlet ports 78 in the flange 76 of the control valve 74 lead to a hollow portion of the flange forming an inlet chamber 98 which leads to a cylindrical passage 100 formed between the outer periphery of the control valve 74 and the inner surface of a sleeve member 102 which may be hydrogen brazed to the piston valve so as to be integral therewith. The sleeve 102 is provided with a plurality of system demand or motor ports 104 which connect the cylindrical passage 100 to the bore 66 and thus to the external connection demand or motor port 48.

The inlet chamber 98 is also connected to an inner end port 106 of the valve 74 leading to a hollow section 108 thereof in which the valve spool 75 is slidably mounted. Inlet pressure is conducted through port 106 to act against a pressure operating surface at one end of the valve spool 75 indicated generally by the numeral 110. A pin 112, one end of which is mounted in a retainer member 114, is slightly slidable through the port 106 creating a restricted port which acts as a dashpot for the displacement of fluid for the inlet port end of the slide valve 75.

The control valve 74 is provided with slotted relief ports 116 which cooperate with slotted relief ports 118 in the slide valve 75 for conducting fluid from the cylindrical passage 100 to a hollow portion 120 in the slide valve 75 which leads to the exhaust chamber 92. The slotted ports 118 of the slide valve 75 are enlarged at the outer periphery thereof, indicated by the numeral 122, to aid in providing proper metering through the ports of the valves.

The sleeve 102 which is integral with the control valve 74 is designed to hold the pressure setting of the pressure regulating device, which is a direct function of the position of the control valve, substantially constant whether all of the pump displacement is being exhausted through the relief ports or being conducted through the motor demand port for operation of the motor. The effective operating surfaces of the control valve are arranged in relation with the porting to compensate for loss in Bernoulli force when flow is decreased or diverted from the relief ports and conducted through the demand or motor port. Opposed to the effective operating surface 80 of the piston flange 76 at the inlet port side of the ports 78 is an effective operating surface comprising the surface area of the sleeve flange 77 exposed to pressure in bore 66 and indicated by the numeral 124, the outer surface area of an inwardly curving portion of the control valve forming a shoulder indicated by the numeral 126, and the end area of the control valve 74 and sleeve 102 within the retainer 86 and indicated by the numeral 128. The total opposed effective surface is preferably designed to be exposed to pressure beyond the motor demand ports 104 of the control valve. When there is no demand for motor fluid all of the pump displacement will be metered through the control and slide valve ports 116 and 118. Because of dynamic flow conditions through the relief ports an unbalanced pressure condition is created on opposing walls of the control valve relief ports 118 with a relatively higher pressure acting against the slotted wall of the ports indicated by the numeral 130. This unbalance opposes the spring 82. When high flow ceases to be diverted through the relief ports because of diverting flow to the demand port, the spring 82 would tend to shift the control valve to a position changing the pressure setting which is adapted to be maintained substantially constant for a given flow by the control valve. Thus when flow is diverted to the demand port the pressure drop created across the demand or motor ports 118 is adapted to compensate for the loss in Bernoulli force across the control valve ports 116 to maintain the pressure setting of the control valve substantially constant for a given flow.

In operation, with the door 34 lowered into the air stream to cause propelling of the blades 40 of the air turbine, the pump 10 will be driven thereby. Fluid is supplied to the pump from the reservoir 12 through the conduit 28 and the displacement from the pump 10 is conducted to the inlet port 30 of the pressure regulating valve 18 by means of conduit 32. If the load device, associated with motor 20, is not to be immediately actuated the directional valve 20 will be maintained in a neutral position closing the pressure port 52 from the other ports of the valve. With no demand for fluid at the motor the demand or motor port 48 of the pressure regulating valve 18 may be considered as closed. The displacement from the pump 10 entering inlet port 30 of the pressure regulating valve is conducted through piston flange ports 78 to inlet chamber 98 and by means of cylindrical passage 100, and piston valve and slide valve ports 116 and 118, respectively, to the hollow portion 120 of slide valve 75. Pump displacement is thence conducted to the exhaust chamber 92 and by means of relief port 42, and conduits 44 and 46 to the reservoir 12.

As the pump comes up to speed the displacement therefrom is at first adequately handled by the ports 78 in the piston flange 76 without unduly restricting the same. However, as the pump speed increases, the displacement therefrom increases and at a predetermined displacement therefrom the ports 78 are adapted to create a restriction for causing a differential of pressure on the opposed operating surfaces of the valve and sleeve member sufficient to overcome the resistance of spring 82, and the valve 74, together with the sleeve 102, will be actuated. When the control valve 74 is actuated, the valve surface trailing the ports 116 passes over slide valve ports 118, restricting the opening of the ports 118. With all of the flow being metered through the control and slide valve ports 116 and 118, inlet pressure is increased. This pressure is transmitted through the end port 106 of control valve 74 to the operating end area of slide valve 75, and when it reaches a predetermined value sufficient to overcome the resistance of spring 96 the slide valve 75 will be actuated.

As the flow and the pressure build up, both the control valve 74 and the slide valve 75 will shift at varying rates until the ends of the control valve 74 and sleeve 102 bottom against the abutment 97 in the retainer member 86. At this point the maximum pressure at which the system is to be operated will be reached and the pressure regulating valve functions as a conventional pressure relief valve. The pressure regulation setting of the device is subject to the load of spring 82 which is a variable depending on the spring rate and the position of control valve 74. The pressure setting will thus change as the control valve 74 shifts with increases in inlet flow.

Prior to reaching the maximum pressure setting and thereafter, all of the displacement from the pump 10 will be conducted through the metering ports 116 and 118 of the valves 74 and 75. With no demand for fluid at the motor 14 there will be no flow across the motor ports 104 of the control valve 74. When it is desired to operate the motor 14 the directional control valve handle 64 may be shifted to connect the pressure port 52 to either of the motor ports 54 or 58 and the remaining motor port will be connected to the tank port 54. Displacement from the pump 10 entering the inlet port 30 of the pressure regulating valve 18 is then directed through the inlet ports 78 in the control valve to the inlet chamber 98 where it is conducted by passage 100, motor port 104, bore 66, port 48, and conduit 50 to the pressure port 52 to directional valve 16. Pump displacement is then directed to one end of the motor by either of conduits 60 or 62, depending on the selective position of directional control valve handle 64. Return fluid from the opposite end of the motor is directed to tank.

When flow is diverted from the relief ports and directed to the motor upon demand, the loss in force on the area 130 of the sleeve ports 118 is compensated for by the pressure drop across the system demand or motor ports 104 of the sleeve 102. The flow that is diverted from being metered through the relief ports of the control and slide valves no longer produces a Bernoulli force on the port area 130 but creates a pressure drop through the sleeve ports 104 which is adjusted to act on the control valve 74 in the same direction and with approximately the same force as the lost force on the port area 130. Thus the forces opposing spring 82 remain substantially constant regardless of the diversion of fluid through the relief or the motor ports of the pressure regulating valve and the pressure setting of the control valve 74 remains substantially constant for a given flow.

The operation of the device is such that, at high flow, advantage may be taken of the highest desirable operating pressure for the system. The device is in effect a relief valve which relieves at pressure dependent upon the displacement of the pump. Fluid may be drawn off for the motor as from any relief valve system as the slide valve tends to close the relief valve ports when there is a dropping of pressure by load device demands at the motor.

In a single engine aircraft, upon failure of the engine, the flight duration is short. The emergency hydraulic air craft system illustrated utilizes the torque output capacity of the prime mover for the pump in the emergency system most efficiently. As the speed of the prime mover decreases, the displacement of the pump is decreased and the control valve 74 senses the decreased displacement in a manner to lower the operating pressure of the system in accordance with the capicity of the prime mover.

The opposed operating surfaces of the control valve 74, including the sleeve 102, are selected with the spring 82 and the porting 78 to create a pressure differential on the valve 74 for actuation thereof at predetermined flows. The operating surface of the slide valve 75 and the spring 96 are selected to cause operation of the slide valve at a predetermined inlet pressure. Thus a predetermined pressure differential across the port 78 of the control valve 74 acting on the opposed operating surfaces of the valve and sleeve cause actuation of the control valve 74. When the control valve 74 is actuated, metering of fluid is accomplished across the relief ports 116 and 118 of the control and slide valves, and the pressure ahead of the slide valve operating surface is increased, causing actuation of the slide valve. The positions of the control valve and slide valve change as flow increases, causing increased inlet pressure across the restricted porting. The control valve and slide valve continue to shift at varying rates with increased flow until the control valve bottoms at which time the maximum operating pressure of the system has been reached. Thus the pressure regulating valve may be utilized for regulating the operating pressures in systems in accordance with displacement characteristics of the pressure fluid source. In addition, provision has been made for overcoming changes in Bernoulli forces to cause extremely accurate operation of the valve, regardless of whether the device is operating as a conventional relief valve or whether flow is being diverted from the device for actuation of the motor in the hydraulic system.

While the form of embodiment of the invention as herein disclosed constitutes a preferred form, it is to be understood that other forms might be adopted, all coming within the scope of the claims which follow.

What is claimed is as follows:

1. A flow sensitive pressure regulating device comprising a housing having an inlet passage adapted for connection to a pressure fluid source, a system passage connected to the inlet passage and adapted to be connected on demand to a fluid operated device, and a pressure relief passage, two valves shiftably mounted in the housing having conjointly controlled porting for connecting the inlet passage to the relief passage, resilient means for each valve biasing the valves to positions permitting flow from the inlet passage to the relief passage, separate operating surfaces for the valves in communication with the inlet passage, means forming a restriction ahead of each valve operating surface, said valves shifting together as increased flow across the restrictions creates pressure increases at the operating surfaces of the valves, and means limiting the operational movement of one of the valves for determining the maximum operating pressure setting of the pressure regulating device.

2. A flow sensitive pressure regulating device comprising a housing having an inlet passage adapted for connection to a pressure fluid source, a system passage connected to the inlet passage and adapted to be connected on demand to a fluid operated device, and a pressure relief passage, two slidable, telescopically arranged valves in the housing having conjointly controlled porting for connecting the inlet passage to the relief passage, resilient means for each valve biasing the valves to positions permitting flow from the inlet passage to the relief passage, separate operating surfaces for the valves in communication with the inlet passage, a restriction ahead of the operating surface of one of said valves for causing operation of the said one valve at a predetermined inlet flow, means forming a restriction ahead of the operating surface of the other valve for causing the other valve to shift with the said one valve at a predetermined inlet pressure as increased flow across the restrictions creates pressure increases at the operating surfaces of the valves, and means limiting the operational movement of one of the valves for determining the maximum operating pressure setting of the pressure regulating device.

3. A flow sensitive pressure regulating device comprising a housing having an inlet port adapted for connection to a pressure fluid source, a system port connected to the inlet port and adapted to be connected on demand to a fluid operated device, and a pressure relief port, two valves shiftably mounted in the housing having porting conjointly controlled for connecting the inlet port to the relief port, the valves having separate operating surfaces in communication with the inlet port, separate resilient means for each valve biasing the valves to positions permitting flow through the conjointly controlled porting, said conjointly controlled porting restricting flow upon the operation of one of said valves and causing pressure increases ahead of the operating surface of the other valve for operating the same, means forming a restriction ahead of the operating surface of the said one valve for causing pressure increases at predetermined increases of inlet flow for operating the said one valve, said valves shifting together as increased flow creates pressure increases at the operating surfaces of the valves, and means limiting the operational movement of the said one valve for determining the maximum operating pressure setting of the pressure regulating device.

4. A flow sensitive pressure regulating device comprising a housing having a pressure inlet port adapted for connection to a variable delivery pressure fluid source, a system port adapted for connection to a fluid operated device on demand, and a pressure relief port, two, slidable, telescopically arranged valves in the housing having conjointly controlled porting for connecting the inlet port to the relief port, each valve having an operating surface and the valves being separately resiliently biased to positions permitting flow through the valve porting from the inlet to the relief port, said conjointly controlled porting restricting flow upon operation of one of said valves, a restriction through which inlet flow must pass, the operating surface of the said one valve being connected to the inlet ahead of the restriction and the operating surface of the other valve being connected to the inlet beyond the restriction and ahead of the valve porting, said valves shifting together after operation of the one valve as flow increases create pressure increases at the operating surfaces of the valves, and means limiting the operational movement of the said one valve for determining the maximum pressure setting of the pressure regulating device.

5. A flow sensitive pressure regulating device comprising a housing having an inlet port adapted for connection to a pressure fluid source, a system port connected to the inlet port and adapted to be connected on demand to a fluid operated device, and a pressure relief port, two valves shiftably mounted in the housing having porting conjointly controlled for connecting the inlet port to the relief port, each valve being separately resiliently biased to a position establishing the lowest operating pressure setting of the device and permitting flow through the porting of the valves, an orifice through which inlet flow must pass and a restriction formed by the conjointly controlled valve porting upon operation of one of the valves, opposed operating surfaces for the said one valve exposed to inlet flow ahead of and beyond the orifice, an operating surface for the other valve exposed to inlet flow beyond the orifice and ahead of the valve porting, said valves shifting together as increased flow creates pressure increases at the operating surfaces of the valves thereby changing the pressure setting of the device with inlet volume changes, and means limiting the operational movement of the said one valve for determining the maximum operating pressure setting of the pressure regulating device.

6. A flow sensitive pressure regulating device comprising a housing having a pressure inlet port adapted for connection to a variable delivery pressure fluid source, a system port adapted for connection to a fluid operated device on demand, and a pressure relief port, two, slidable, telescopically arranged valves in the housing having conjointly controlled porting for connecting the inlet port to the relief port, each valve being separately resiliently biased to a position establishing the lowest operating pressure setting of the device and permitting flow through the porting of the valves, an orifice through which inlet flow must pass and a restriction formed by the conjointly controlled valve porting upon operation of one of the valves, opposed operating surfaces for the said one valve exposed to inlet flow ahead of and beyond the orifice, an operating surface for the other valve exposed to inlet flow beyond the orifice and ahead of the valve porting, said valves shifting together as increased flow creates pressure increases at the operating surfaces of the valves thereby changing the pressure setting of the device with inlet volume changes, and means limiting the operational movement of the said one valve for determining the maximum operating pressure setting of the pressure regulating device.

7. A flow sensitive pressure regulating device comprising a housing, two, slidable and telescopically arranged valves in the housing and forming with the housing a pressure relief passage and an inlet passage leading to a system demand passage, said valves having conjointly controlled porting through which excessive pressure fluid is relieved from the inlet passage to the relief passage and which upon operation of one of the valves restricts flow between the inlet and the relief passages, a restriction in the inlet passage, separate resilient means biasing the valves to the lowest operating pressure setting, separate operating surfaces for the valves, the operating surface of one of said valves being exposed to pressure in the inlet passage ahead of the restriction and the operating surface of the other valve being exposed to pressure in the inlet passage beyond the restriction and ahead of the valve porting, said restriction causing increases of pressure at predetermined increases of inlet flow for operating the said one valve and said valves shifting together as flow increases are sensed by the restriction and restricted porting to cause pressure increases on the operating surfaces of the valves, and means limiting the operational movement of the said one valve for determining the maximum operating pressure setting of the pressure regulating device.

8. A flow sensitive pressure regulating device comprising a housing having two slidable valves mounted therein and forming with the housing an inlet passage, a system demand passage and a relief passage, the valve having porting conjointly controlled by the valves for connecting the inlet passage to the relief passage and being resiliently biased to positions permitting flow through the porting, means forming two restrictions in the inlet passage and a fluid port connecting the inlet passage to the demand passage, one of said valves having opposed operating surfaces one of which is exposed to inlet pressure ahead of both restrictions and the other of which is exposed to inlet pressure beyond the system demand port, said one valve having another operating surface effective to oppose the resilient biasing means of the valve when there is no demand for fluid through the demand passage, and said other valve having an operating surface exposed to inlet pressure between the restrictions in the inlet passage, the said restrictions sensing increases in inlet flow to create pressure increases for shifting the valves to positions establishing an increased operating pressure setting for predeterminad inlet flow, and the location of the demand port creating a pressure drop across the opposed operating surfaces compensating for the loss of force on the other operating surface of the said one valve when flow is diverted from the conjointly controlled valve porting to the system demand passage.

9. A flow sensitive pressure regulating device comprising a housing having two slidable telescopically arranged valves therein and forming with the housing an inlet passage connected to a system demand passage by a system port and a pressure relief passage, the valves having porting conjointly controlled for connecting the inlet passage to the relief passage and being separately resiliently biased to positions permitting flow from the inlet to the relief passage, an orifice in the inlet passage and a restriction at the valve porting being created upon operation of one of the valves, one of said valves having opposed operating surfaces, one of said surfaces being connected to the inlet passage ahead of the orifice and the other of said surfaces being connected to the system passage beyond the system port, said one valve having a third pressure operating surface effective to oppose the resilient biasing means of said valve when flow is substantially diverted through the valve porting, and an operating surface for the other valve exposed to the inlet passage pressure beyond the orifice and ahead of the valve porting, said orifice causing increases of pressure at a predetermined inlet flow volume for causing operation of the said one valve and said valves shifting together with flow increases for establishing increases in the operating pressure settings of the device, the location of the demand port creating a pressure drop across the opposed operating surfaces of the said one valve compensating for the loss of force on the third operating surface when flow is diverted from the conjointly controlled valve porting to the system demand passage.

10. A flow sensitive pressure regulating device comprising a housing having two slidable telescopically arranged valves mounted therein and forming with the housing an inlet passage connected by a system demand port to a system passage and a pressure relief passage, said valves having conjointly controlled porting for connecting the inlet passage to the relief passage and being resiliently biased to positions permitting flow through the porting, an orifice in the inlet passage, and a restriction created at the porting of the valves upon operation of one of said valves, opposed operating surfaces for the said one valve one of which is exposed to inlet pressure ahead of the orifice and the other which is exposed to pressure in the system passage beyond the system demand port, said one valve having a third operating surface exposed to inlet pressure ahead of the valve porting and effective upon dynamic flow conditions through the valve porting for opposing the resilient biasing means of the said one valve, said valves shifting together with increases of flow to establish an operating pressure setting commensurate with the flow, the location of the system demand port causing a pressure drop across the opposed operating surfaces of the said one valve upon diversion of fluid from the porting of the valves to the system demand passage to compensate for the loss in force on the third operating surface and thereby maintaining the operating pressure setting of the device constant at a given flow for a given position of the said one valve.

11. In a fluid pressure power transmission wherein the prime mover is susceptible to stalling in its lower speed ranges, the combination of: a fixed displacement pump driven by said prime mover; and a pump discharge rate regulated, pressure responsive relief valve controlling the maximum discharge pressure of said pump, said valve having a low relief pressure at low pump discharge rates and including means responsive to an increase in pump discharge rate to increase said relief pressure.

12. In a fluid pressure power transmission wherein the prime mover is susceptible to stalling in its lower speed ranges, the combination of: a fixed displacement pump driven by said prime mover; and a pump discharge rate regulated, pressure responsive relief valve controlling the maximum discharge pressure of said pump, said valve having a bleed path therethrough at zero pump discharge and a low relief pressure at low pump discharge rates and including means responsive to an increase in pump discharge rate to block said bleed path and to increase said relief pressure.

13. In a fluid pressure power transmission including a fixed displacement pump and a prime mover for driving the pump which is susceptible to stalling in its lower speed ranges, the combination of: a pressure responsive relief valve for controlling the discharge pressure of the pump, said valve having a bleed therethrough irrespective of pressure at low discharge rates of the pump to the relief valve, and including means responsive to increasing discharge rates of the pump for increasing the relief pressure of said pressure responsive valve from a normally low relief pressure.

References Cited in the file of this patent
UNITED STATES PATENTS

| | | |
|---|---|---|
| 1,934,758 | Temple | Nov. 14, 1933 |
| 2,642,077 | Waterman | June 16, 1953 |
| 2,690,190 | Farrell | Sept. 28, 1954 |